United States Patent
Sato et al.

(10) Patent No.: US 7,060,890 B2
(45) Date of Patent: Jun. 13, 2006

(54) KEYBOARD MUSICAL INSTRUMENT STRUCTURE

(75) Inventors: Shigeaki Sato, Hamamatsu (JP); Nobuo Sugiyama, Hamamatsu (JP)

(73) Assignee: Yamaha Corporation, Shizuoka-ken (JP)

( * ) Notice: Subject to any disclaimer, the term of this patent is extended or adjusted under 35 U.S.C. 154(b) by 185 days.

(21) Appl. No.: 10/789,999

(22) Filed: Mar. 2, 2004

(65) Prior Publication Data
US 2004/0173086 A1 Sep. 9, 2004

(30) Foreign Application Priority Data
Mar. 4, 2003 (JP) ............................. 2003-057133

(51) Int. Cl.
*G10H 1/34* (2006.01)
*G10H 3/00* (2006.01)

(52) U.S. Cl. ........................................................ 84/745
(58) Field of Classification Search ................. 84/743, 84/744, 718, 719
See application file for complete search history.

(56) References Cited

U.S. PATENT DOCUMENTS 5,797,573 A  8/1998  Nasu
6,054,641 A  4/2000  Inoue
6,120,000 A  9/2000  Aeschbach et al.
6,288,313 B1  9/2001  Sato et al.

FOREIGN PATENT DOCUMENTS

| GB | 210390 | 7/1923 |
| JP | 09-179545 | 7/1997 |
| KR | 1997-0017160 | 4/1997 |

OTHER PUBLICATIONS

"DGP-2XG Electronic Grand Piano Manual"; Yamaha Corporation; 2001.
Copy of Korean Office Action dated Sep. 28, 2005 (and English translation of same).

*Primary Examiner*—Jeffrey W Donels
(74) *Attorney, Agent, or Firm*—Dickstein, Shapiro, Morin & Oshinsky, LLP.

(57) ABSTRACT

An electronic grand piano comprises a plurality of keys arranged on a keybed, a plurality of actions interlocked with the keys, and an electric circuit unit for performing tone-generation operations based on operations of the actions when the keys are operated. A pair of slide portions, each having an elongated shape, are arranged in parallel and are fixed to outer peripheries of the electric circuit unit. A pair of guide portions are arranged in parallel with respect to a main body of the piano and are loosely engaged with the slide portions. When the electric circuit unit is moved in a prescribed direction relative to the main body, it is automatically stopped and fixed at a prescribed position by means of a fixing structure.

5 Claims, 4 Drawing Sheets

KEYBOARD MUSICAL INSTRUMENT STRUCTURE

BACKGROUND OF THE INVENTION

1. Field of the Invention

This invention relates to structures of keyboard musical instruments such as electronic grand pianos.

This application claims priority on Japanese Patent Application No. 2003-57133.

2. Description of the Related Art

Conventionally, various electronic pianos such as electronic grand pianos have been developed to simulate real key touch (e.g., real key-touch feeling or sensation) actualized on acoustic grand pianos by using actions simulating actions of acoustic grand pianos, examples of which are disclosed in Japanese Patent Application Publication No. Hei 9-179545 (which claims priority on Japanese Patent Application No. Hei 7-280744, and which corresponds to U.S. Pat. No. 6,054,641), and the paper entitled "DGP-2XG Electronic Grand Piano Manual" published by Yamaha Corporation in the year 2001.

In the aforementioned electronic grand piano, adjusting of actions is an important factor to define the sound quality, wherein actions are arranged to provide the user (or player) with real key-touch feelings so that actual sounds are produced electronically. Specifically, a typical example of the electronic grand piano comprises various sensors for detecting operations of keys and hammers, so that musical tone signals are synthesized and produced based on detection results of the sensors. Synthesizing musical tone signals naturally require electronic circuits and components such as a control circuit for a sound source circuit (or a tone generator), an amplifier, and a speaker (or speakers). In the conventional electronic grand piano, the aforementioned electronic circuits and components are independently built in the main body (i.e., the casing or housing of the musical instrument) and are connected together via mutual wiring therebetween.

Prior to the completion in assembling electronic circuits and components, the main body of the electronic grand piano should be approximately completed in assembly (or in production). For this reason, it may be possible for an inspector to check operations of a power transformer, a sound source circuit, and other individual parts with ease during the production thereof; however, it may be difficult to check the overall operation of the assembly of electronic circuits and components. In order to install a relatively heavy component (e.g., a power transformer) in the lower side of the grand piano, it is necessary for the worker to assemble them by (manually) supporting them at prescribed positions. This deteriorates workability in the production of the electronic grand piano. That is, there occur various risks for a single worker in assembling mechanical and electronic parts together; thus, multiple workers should be necessary in order to assemble them together with safety.

SUMMARY OF THE INVENTION

It is an object of the invention to provide a structure for a keyboard musical instrument such as an electronic grand piano, which makes it possible to check the overall operation of electronic circuits and components incorporated into the keyboard musical instrument during the production thereof, whereby it is possible to realize a high workability in producing the keyboard musical instrument.

A keyboard musical instrument (e.g., an electronic grand piano) of this invention basically comprises a main body (or a keyboard casing or housing), a plurality of keys arranged on a keybed, a plurality of actions driven responsive to the keys being operated, and a tone generator (e.g., an electric circuit unit realizing tone-generation functions using speakers) for performing tone-generation operations responsive to operations of the actions. This invention is characterized in that a pair of slide portions are arranged in parallel with each other and elongated in a prescribed direction on the outer peripheral portions of the tone generator, and a pair of guide portions are correspondingly arranged in parallel at prescribed positions of the main body of the keyboard musical instrument to allow the slide portions to be loosely engaged therewith, wherein the guide portions are fixed to the lower surface of the keybed by means of metal fittings such as externally-threaded screws and internal threads. Thus, the tone generator can be freely moved in a prescribed direction such that the slide portions thereof slide along the guide portions, wherein it is stopped at the prescribed position at which the rear ends of the slide portions are positionally regulated with respect to the keybed of the main body of the keyboard musical instrument.

In the above, each guide portion is shaped to have a crank-like cross section such that it is constituted by two flat boards, which are arranged in parallel and one of which is connected via another flat board, wherein one of the 'parallel' flat boards is fixed to the main body, so that the slide portion is loosely engaged in the space formed between the other of the 'parallel' flat boards and the main body (i.e., keybed) of the keyboard musical instrument.

In summary, the tone generator is provided independently of the main body of the keyboard musical instrument, wherein they are assembled together such that the slide portions of the tone generator is loosely engaged with the guide portions fixed to the main body by means of metal fittings and the like. Hence, it is possible for the inspector (or worker) to easily check the overall operation of the tone generator before completion of the production of the main body of the keyboard musical instrument.

BRIEF DESCRIPTION OF THE DRAWINGS

These and other objects, aspects, and embodiments of the present invention will be described in more detail with reference to the following drawings, in which.

DESCRIPTION OF THE PREFERRED EMBODIMENT

This invention will be described in further detail by way of examples with reference to the accompanying drawings.

The overall structure of an electronic grand piano will be described in accordance with a preferred embodiment of this invention with reference to FIGS. 1 and 2.

Figure 1:
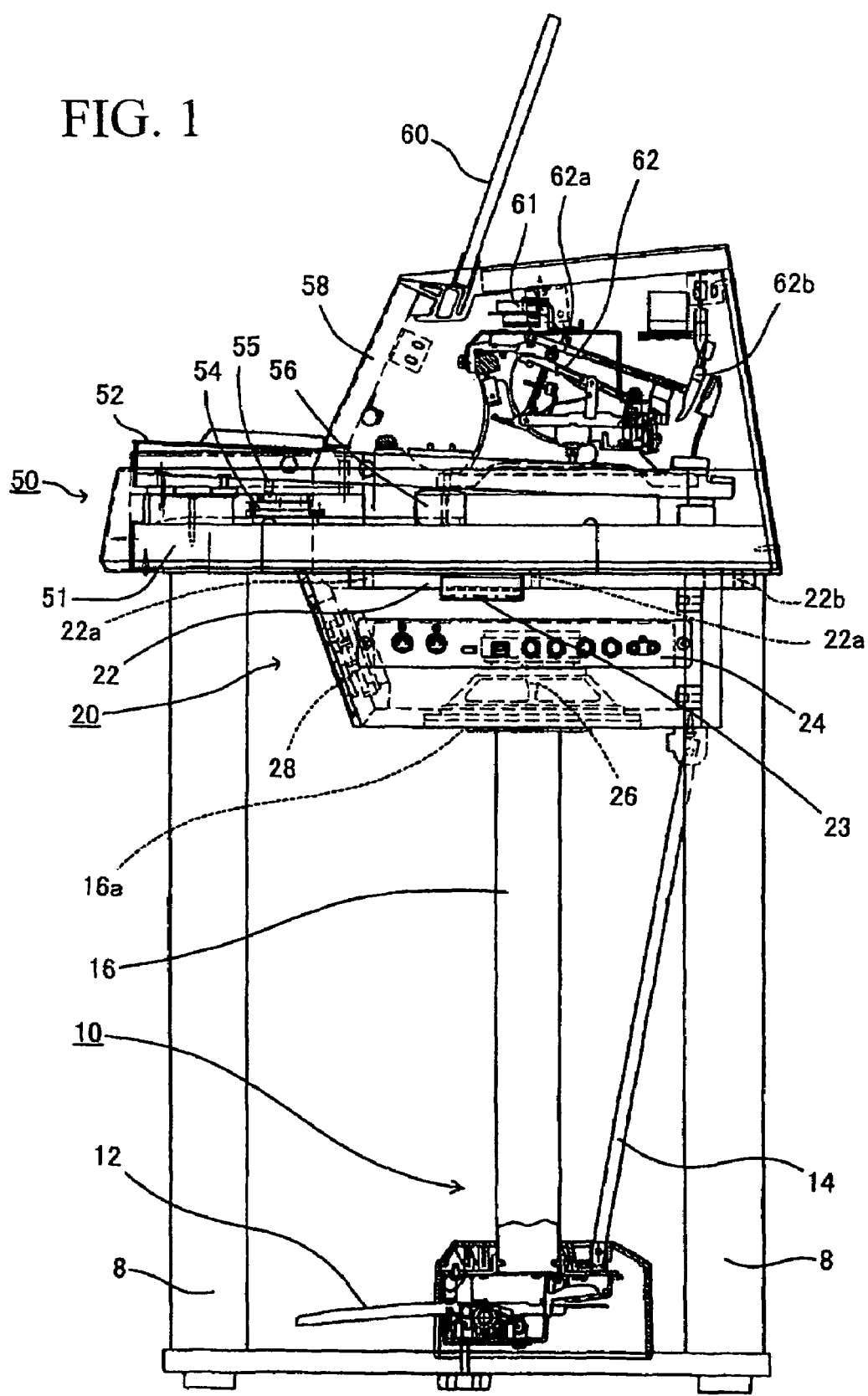
FIG. 1 is a side view partly in cross section showing the structure of an electronic grand piano in accordance with a preferred embodiment of the invention.

In FIG. 1, reference numeral 50 designates a main body (or a keyboard housing) of the electronic grand piano in which a plurality of keys 52 are arranged on a keybed 51, wherein each key 52 is pivotally supported by a balance pin 56, and a key shutter 55 having a flat-plate-like shape is attached to the lower surface of the front portion of the key 52 from which it projects downwardly. Reference numeral 54 designates a key sensor unit in which a light emitting diode (LED) and a photodiode for receiving light emitted from the LED are respectively arranged at prescribed positions with respect to the key shutter 55 moved downwardly as the key 52 is depressed. Thus, it is possible to detect a key-depression depth (i.e., a distance by which the front portion of the key 52 moves downwardly when depressed) by means of the key sensor unit 54.

Reference numeral 62 designates an action that is arranged above the rear portion of the key 52, which pivotally moves with respect to the balance pin 56, wherein the action 62 comprises a hammer 62b and other parts that are driven when the key 52 is operated. A hammer shutter 62a having a flat-plate-like shape is attached onto a shaft of the hammer 62b from which it projects upwardly. Reference numeral 61 designates a hammer sensor unit in which a LED and a photodiode for receiving light emitted from the LED are arranged at prescribed positions with respect to the hammer shutter 62a when the hammer 62b is driven to move upwards. Thus, it is possible to detect a speed of the hammer 62b by means of the hammer sensor unit 61.

Four support legs 8 are respectively fixed to prescribed positions corresponding to four corners of the keybed 51 of the main body 50 from which they project downwardly. An electric circuit unit (or an electronic circuit unit) 20 roughly having a square column like shape is arranged below the keybed 51 at its center area or its rear area. An input/output unit 24 for inputting and outputting various signals is arranged on the right side of the electric circuit unit 20. In addition, two support members 16 are fixed to prescribed positions of the electric circuit unit 20 from which they project downwardly. A pedal unit 10 having three pedals (all designated by the same reference numeral '12') is fixed at the lower end position associated with the lower ends of the two support members 16.

Figure 2A:
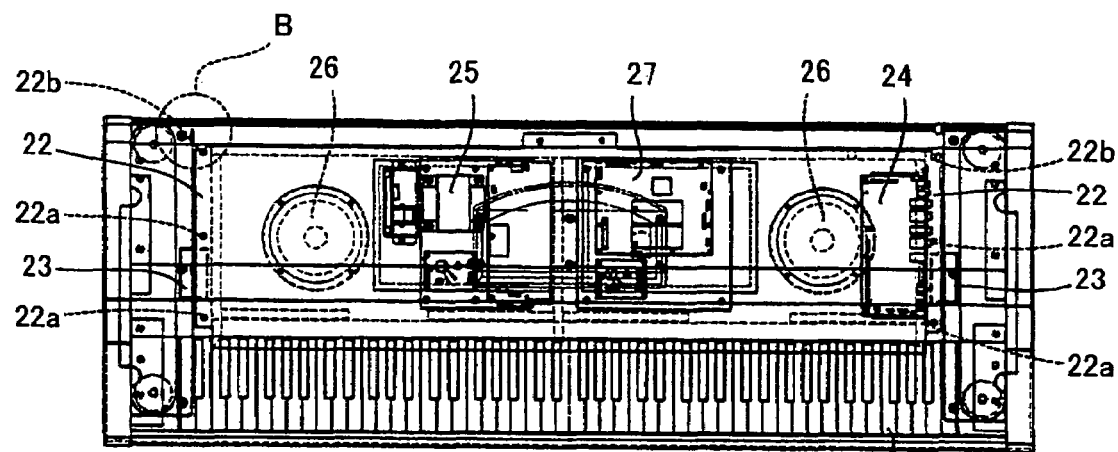
FIG. 2A is a plan view partly in cross section showing the internal constitution of an electric circuit unit installed in the electronic grand piano.

As shown in FIG. 2A, a pair of slide portions 22 each having an elongated rectangular parallelopiped shape are formed at upper positions on the left and right sides of the electric circuit unit 20, and they are each linearly elongated from the front to the rear of the electric circuit unit 20. Four through holes 22a in total allowing externally-threaded screws to be inserted therein are formed to penetrate through the front ends and the centers of the slide portions 22 respectively. In addition, cutout portions 22b that externally-threaded screws are brought into contact with so as to be stopped are formed on the rear ends of the slide portions 22 respectively. Reference numeral 23 designate guide portions that are arranged to hold the slides 22 from their left and right sides therebetween.

Next, details of a selected portion A encompassed by dotted lines in FIG. 2B will be described with reference to FIG. 3A.

Reference numeral 74 designates a bridge board having an elongated flat plate like shape, which is fixed to the lower surface of the keybed 51 and which is elongated from the front to the back at each side of the keybed 51. The upper ends of the support legs 8 are fixed to the keybed 51 via the bridge board 74. In addition, internal threads 51a are formed and opened at prescribed positions on the lower surface of the keybed 51, wherein they are arranged with equal distances therebetween in association with the through holes 22a and the cutout portions 22b. Hence, the guide portions 23 are each shaped such that the corresponding single sides of two flat boards arranged in parallel with each other are connected via another flat board, wherein one of the two flat boards matches the bridge board 74. Internal threads 51b are formed at prescribed positions for fixing the guides 23 to the keybed 51, whereby externally-threaded screws 72 are introduced into and engaged with the internal threads 51b via the guide portion 23 and the bridge board 74, so that the guide portion 23 can be firmly fixed to the lower surface of the keybed 51. Herein, the slide portion 22 is loosely inserted into the space formed between the other of the two flat boards, which are arranged in parallel in the guide portion 23, and the lower surface of the keybed 51. Due to such a loosely engaged state established for each of the slide portions 22, it is possible to freely move the electric circuit unit 20 in front-back directions while the slides 22 slide with the guides 23 respectively.

Figure 2B:
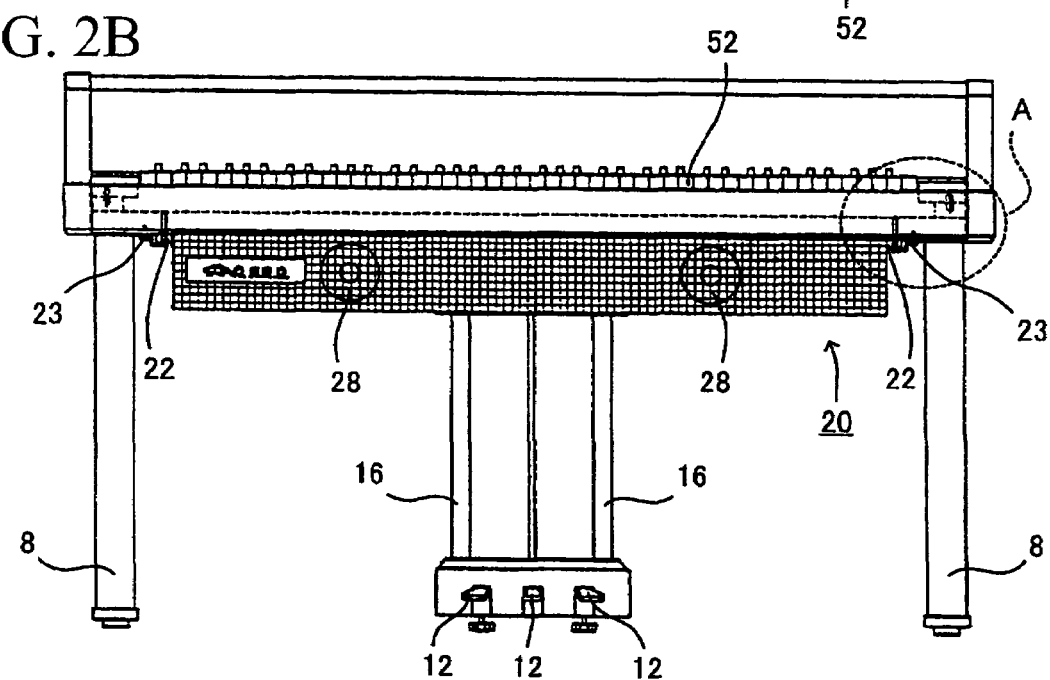
FIG. 2B is a front view in which the electric circuit unit is fixed to a keybed of a main body of the electronic grand piano.
Figure 3A:
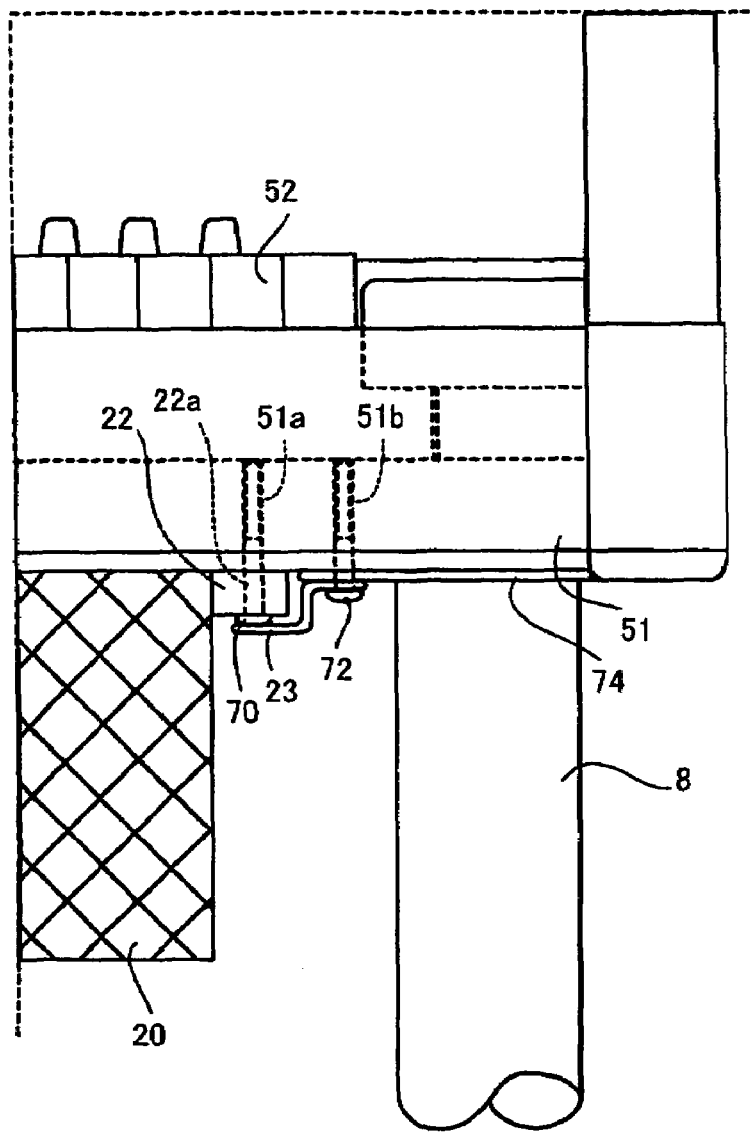
FIG. 3A is an enlarged view partly in cross section magnifying essential parts incorporated into an area A shown in FIG. 2B.

With reference to FIGS. 2A and 2B, a pair of left and right woofers 26 are arranged in the bottom of the electric circuit unit 20 such that their openings are directed downwards. In addition, a pair of left and right speakers 28 are arranged on the front side of the electric circuit unit 20 such that their openings are slanted and roughly directed downwards. Furthermore, the electric circuit unit 20 incorporates a power transformer 25, a circuit board 27, and other electric parts and components, which are mutually connected together inside of the electric circuit unit 20. A performance information generation circuit for generating performance information based on detection signals output from the key sensor unit 54 and the hammer sensor unit 61, and a sound source for generating musical tone signals based on the performance information, and other electronic components are arranged on the circuit board 27.

Figure 4B:
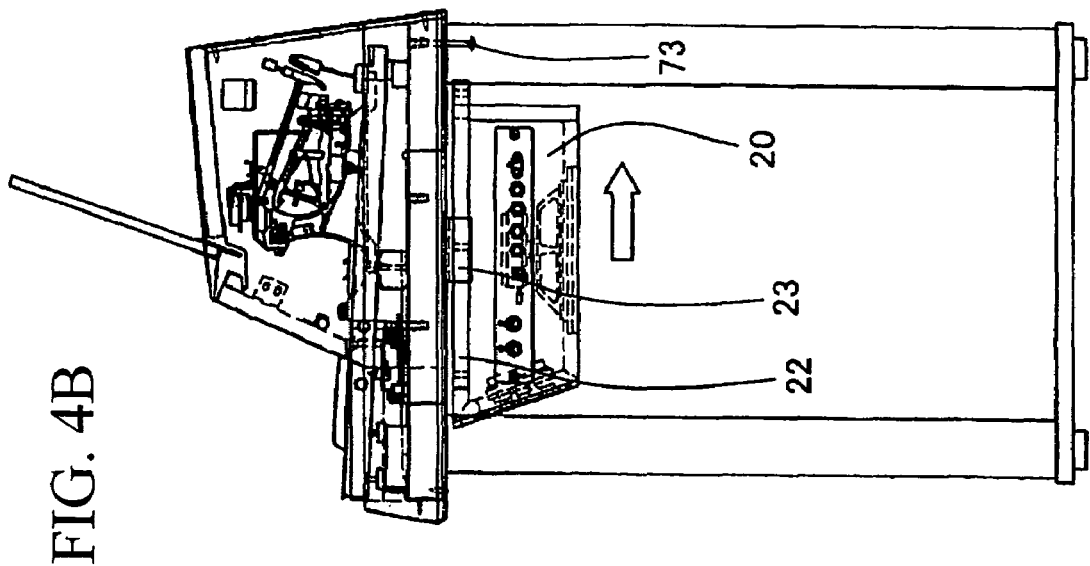
FIG. 4B is a side view partly in cross section showing that the electric circuit unit is completely attached to the main body of the electronic grand piano.

Next, the manual operation for installing the electric circuit unit 20 in the electronic grand piano will be described with reference to FIGS. 4A and 4B.

Figure 3B:
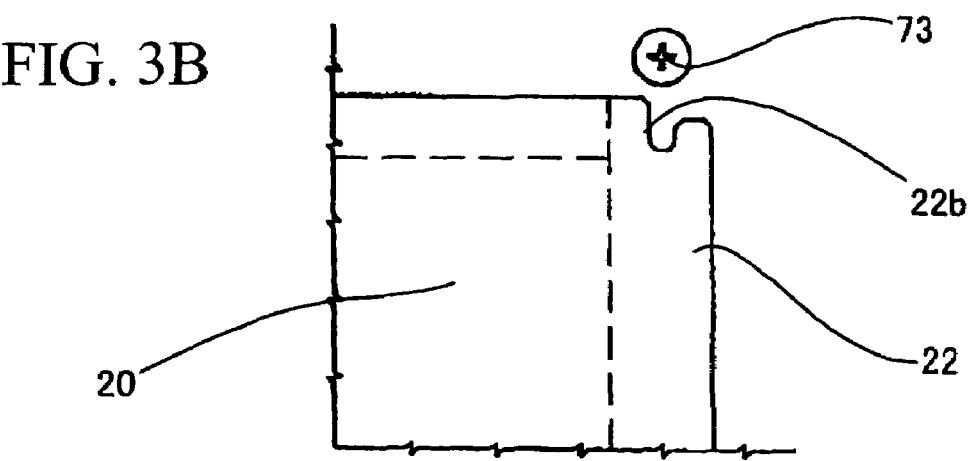
FIG. 3B is an enlarged view showing a positional relationship between a rear end of a slide portion of the electric circuit unit and an externally-threaded screw attached to the keybed of the main body of the electronic grand piano.
Figure 4A:
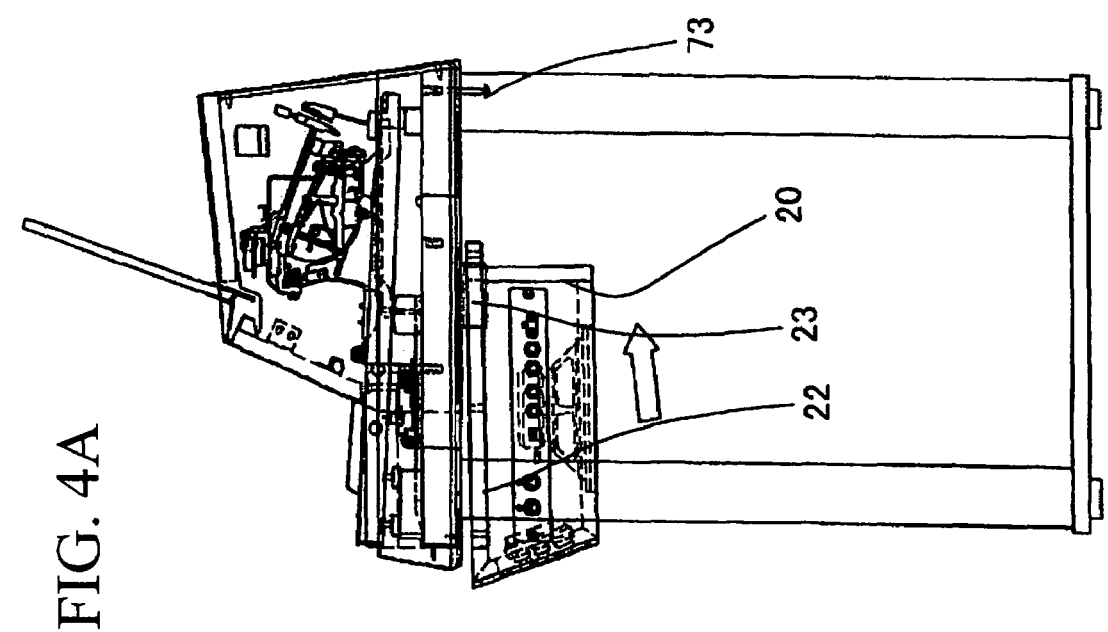
FIG. 4A is a side view partly in cross section showing the electric circuit unit that is being attached to the main body of the electronic grand piano.

First, the externally-threaded screws 73 are slightly engaged with the internal threads 51 formed at the left and right sides of the rear end portion of the keybed 51, and the ends of the slide portions 22 are loosely engaged with the guide portions 23 respectively (see FIG. 4A). Then, the electric circuit unit 20 is slowly moved backwards while the slide portions 22 slide along the guide portions 23, whereby the cutout portions 22b formed in the rear ends of the slides 22 are approaching towards the externally-threaded screws 73. Details of relationships between the aforementioned parts in this stage are shown in FIG. 3B. When the cutout portions 22b come in contact with the externally-threaded screws 73, the electric circuit unit 20 cannot be further moved backwards. At this position at which the cutout portions 22b of the slides 22 come in contact with the externally-threaded screws 73, the electric circuit unit 20 is precisely installed in the electronic grand piano. At this position, four externally-threaded screws 70 are respectively inserted into the four through holes 22a and are engaged with the internal threads 51 formed in the keybed 51. Thereafter, the aforementioned externally-threaded screws 70 and 73 are tightened so that the electric circuit unit 20 can be firmly fixed to the keybed 51 as shown in FIG. 3A.

As described above, the present embodiment is characterized by that the electric circuit unit 20 incorporating the power transformer 25, circuit board 27, woofers 26, speakers 28, and the like is provided independently of the main body of the electronic grand piano including the actions 62, wherein the electric parts can be mutually connected together. This makes it possible for the inspector (or worker) to easily check the overall operation of the electric circuit unit 20 before completion of the production of the main body 50 of the electronic grand piano. Herein, the electric circuit unit 20 is designed to have a sliding ability in that the slide portions 22 thereof are loosely engaged with the guide portions 23. Hence, when the electric circuit unit 20 is attached to the main body 50 of the electronic grand piano, it is possible to reliably avoid a risk that the electric circuit unit 20, which is a relatively heavy component, accidentally falls. This allows the worker to assemble mechanical and electrical parts for the electronic grand piano with safety.

This invention is not necessarily limited to the present embodiment, which can be modified in a variety of ways as follows:

(1) In the present embodiment, the guide portions 23 are arranged on the left and right sides of the keybed 51 so as to allow the electric circuit unit 20 to slide in front-back directions with respect to the keybed 51. It is possible to modify the present embodiment such that the guide portions 23 are arranged on the front and rear sides of the keybed 51, and the slide portions 22 are correspondingly arranged for the electric circuit unit 20, whereby the electric circuit unit 20 can slide in left-right directions with respect to the keybed 51.

(2) The present embodiment uses the electric circuit unit 20, which incorporates the input/output unit 24, power transformer 25, and circuit board 27, as an example of a tone generator to be installed in the electronic grand piano. Of course, the tone generator is not necessarily limited to the aforementioned electric circuit unit 20, and it can be freely designed to perform tone-generation operations in response to operations of actions. For example, the woofers 26 and speakers 28 can be installed in different speaker boxes, which are used for the tone generator. In this case, slide portions are formed in a vertical direction on the prescribed sides of the speaker boxes, while guide portions are formed in a vertical direction on both sides main body 50 of the electronic grand piano, whereby the worker (or user) can simply put the speaker boxes into the main body 50 such that the slide portions slide along the guide portions.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A structure for a keyboard musical instrument that comprises a main body, a plurality of keys arranged on a keybed, a plurality of actions interlocked with the plurality of keys, and a tone generator for performing tone-generation operations in response to operations of the hammers, said structure for a keyboard musical instrument comprising:

a pair of slide portions, each having an elongated shape, that are arranged in parallel with each other and are fixed to outer peripheries of the tone generator;

a pair of guide portions that are arranged in parallel with respect to the main body, whereby the slide portions are loosely engaged with the guide portions so as to allow the tone generator to move in a prescribed direction while being guided by the guide portions; and a fixing structure for automatically stopping the movement of the tone generator to be fixed at a prescribed position when the tone generator is completely engaged with the main body.

2. The structure for a keyboard musical instrument according to claim 1, wherein each of the slide portions is loosely inserted into a space formed between the keybed and each of the guide portions.

3. The structure for a keyboard musical instrument according to claim 1, wherein each of the guide portions is constituted by first and second flat boards that are arranged in parallel, and a third flat board, by which the first and second flat boards are connected together at prescribed sides thereof, so that each of the guide portions is shaped in a crank form in cross section thereof and the first flat board is fixed to the main body, whereby each of the slide portions is loosely inserted into a space formed between the second flat board and the main body.

4. The structure for a keyboard musical instrument according to claim 1, wherein the tone generator comprises a pair of speakers that electronically produce musical tones in response to operations of the hammers interlocked with the keys being operated.

5. The structure for a keyboard musical instrument according to claim 1, wherein each of the slide portions has a cutout portion that comes in contact with a part of the fixing structure when the tone generator is moved deeply in the prescribed direction, so that the tone generator is stopped in movement.

* * * * *